(12) United States Patent
Carlson et al.

(10) Patent No.: US 7,891,447 B2
(45) Date of Patent: Feb. 22, 2011

(54) REMOTELY CONTROLLED VEHICLE WITH A TRACK MECHANISM AND INDEPENDENTLY OPERATED WHEELS

(75) Inventors: Gabriel Carlson, Los Angeles, CA (US); Dominic Laurienzo, Los Angeles, CA (US); Michael Bernstein, Hermosa Beach, CA (US)

(73) Assignee: Jakks Pacific, Inc., Malibu, CA (US)

( * ) Notice: Subject to any disclaimer, the term of this patent is extended or adjusted under 35 U.S.C. 154(b) by 117 days.

(21) Appl. No.: 12/287,002

(22) Filed: Oct. 2, 2008

(65) Prior Publication Data

US 2009/0095544 A1    Apr. 16, 2009

Related U.S. Application Data

(60) Provisional application No. 60/997,205, filed on Oct. 2, 2007.

(51) Int. Cl.
     *B62D 11/00*      (2006.01)
     *B62D 55/00*      (2006.01)

(52) U.S. Cl. ............... 180/9.44; 180/6.48; 180/6.5; 180/65.6

(58) Field of Classification Search ............ 180/6.2, 180/6.24, 6.48, 6.5, 6.7, 9, 9.1, 9.22, 9.44, 180/9.46, 65.1, 65.6
See application file for complete search history.

(56) References Cited

U.S. PATENT DOCUMENTS

| | | | | |
|---|---|---|---|---|
| 2,770,310 A | * | 11/1956 | Gates | 180/9.22 |
| 3,664,447 A | * | 5/1972 | Kane | 180/185 |
| 4,204,583 A | * | 5/1980 | Toyoura et al. | 180/9.28 |
| 4,598,783 A | * | 7/1986 | Tippen | 180/9.32 |
| 5,127,714 A | | 7/1992 | Satzler | |
| 6,044,921 A | | 4/2000 | Lansberry | |
| 6,132,287 A | | 10/2000 | Kuralt et al. | |
| RE37,098 E | | 3/2001 | Lansberry | |
| 6,425,450 B1 | * | 7/2002 | Lansberry | 180/9.36 |
| 2006/0220456 A1 | | 10/2006 | Sugahara | |
| 2008/0093131 A1 | * | 4/2008 | Couture et al. | 180/9.1 |

* cited by examiner

*Primary Examiner*—Lesley Morris
*Assistant Examiner*—Marc A Scharich
(74) *Attorney, Agent, or Firm*—Tope-McKay & Associates (57) ABSTRACT

A remotely controlled vehicle with a track mechanism and independently operated wheels is described. The vehicle includes a track assembly that includes a center track drive wheel and corresponding endless center track. A pair of driving wheels are mounted on opposing lateral sides of the track assembly. Two independently operated motors are included, each supplying power to only one of the driving wheels. A differential gear set is operatively connected between each of the two motors and the center track drive wheel. The gear set is formed to drive the center track drive wheel in a vehicle driving direction when both motors are concurrently operated to drive the pair of driving wheels in the vehicle driving direction. The gear set also imparts a minimal force to the center track drive wheel when each of the motors are operating to drive the pair of driving wheels in opposing directions.

8 Claims, 8 Drawing Sheets

REMOTELY CONTROLLED VEHICLE WITH A TRACK MECHANISM AND INDEPENDENTLY OPERATED WHEELS

PRIORITY CLAIM

The present application is a non-provisional utility application, claiming the benefit of priority of U.S. Provisional Application No. 60/997,205, filed on Oct. 2, 2007, entitled, "Remotely Controlled Vehicle with a Track Mechanism and Independently Operated Wheels."

BACKGROUND OF THE INVENTION (1) Field of Invention

The present invention relates to a remotely controlled vehicle and, more particularly to a remotely controlled track mechanism that includes two independently operated wheels that laterally flank the track mechanism.

(2) Description of Related Art

Vehicles including track mechanism have long been known in the art. A notable benefit of a track mechanism is that it provides for a lengthened contact point with a ground surface to substantially increase the vehicles traction capacity. Commonly known track mechanisms are the track assemblies that are typically included with a military tank. For example, a tank includes a track assembly with a set of endless ground-engaging tracks that extend in the tank's driving direction. Each of the tracks is typically operated independently, thereby allowing a user to propel the vehicle by operating by tracks simultaneously in the same direction, or turn the vehicle by operating a single track or both tracks in opposite directions.

With the advent of remotely controlled vehicles, it was only a matter of time until actual vehicle propulsion systems found their way into their toy vehicle counterparts. For example, remotely controlled tanks currently exist that allow children and other users to operate replicas of the larger machines. Existing remotely controlled track-driven toy vehicles operate similarly to the original machines in that they include at least two endless ground-engaging tracks. The two tracks are required to enable the toy vehicle to turn. In other words, if only a single track was included (without any other propulsion mechanism), it would be difficult if not impossible to turn the vehicle.

While tracks are sufficient for propulsion, they are not necessarily the most effective turning mechanisms. Alternatively, remotely controlled vehicles that include a pair of wheels have also been devised. With only a pair of wheels, the vehicles can efficiently turn in place because they each include only a single point of contact with a ground surface. While lacking the traction benefits of a track, a set of independently controlled wheels provides an efficient and effective propulsion and turning mechanism. Nevertheless, the wheels alone lack the traction benefits of the track.

Thus, a continuing need exists for a remotely controlled toy vehicle that includes a both a track assembly for increased traction and a set of independently controlled wheels for effective propulsion and turning.

SUMMARY OF INVENTION

The present invention relates to a vehicle with a track mechanism and independently operated wheels. The vehicle comprises a main frame structure and a track assembly. The track assembly includes a center track drive wheel mounted with respect to the main frame structure and an endless center track that extends in a vehicle driving direction. A pair of driving wheels is mounted on opposing lateral sides of the track assembly in flanking relation. Each of the driving wheels including a ground engaging traction surface spaced laterally from the endless track and oriented generally in the vehicle driving direction. Two independently operated motors are connected with the frame, where each motor is arranged to supply power to only one of the driving wheels. A differential gear set is operatively connected between each of the two motors and the center track drive wheel. The differential gear set includes gears that are formed to drive the center track drive wheel in a vehicle driving direction when both motors are concurrently operated to drive the pair of driving wheels in the vehicle driving direction. The differential gear set is further formed to impart a driving force to each of the driving wheels that is greater than a driving force imparted to the center track drive wheel when each of the motors are operating to drive the pair of driving wheels in opposing directions, thereby causing the vehicle to turn.

In another aspect, a receiver is attached with the main frame structure. The receiver is operable for receiving a control signal from a transmitter and controlling the pair of motors in accordance with the control signal, thereby allowing a user to remotely control the vehicle.

In yet another aspect, the main frame structure includes a front portion and a rear portion. The vehicle further comprises a front idler pulley attached with the front portion and a rear idler pulley attached with the rear portion, such that the center track wraps around the front idler pulley, the center track drive wheel, and the rear idler pulley.

In another aspect, the present invention further comprises a pair of outer wheels mounted on opposing lateral sides of the pair of driving wheels in flanking relation, each of the outer wheels attached with a corresponding driving wheel such that operating a driving wheel operates the corresponding outer wheel.

In yet another aspect, the center track drive wheel includes a centrally disposed hub, the pair of driving wheels includes a first driving wheel and a second driving wheel, and the two motors include a first motor and a second motor. Additionally, the differential gear set is positioned within the hub and includes a first gear rotationally attached to the hub; a second gear rotationally attached to the hub, opposite the first gear; a third gear attached with a drive shaft that connects the first motor with the first driving wheel, the third gear operably connected with both the first gear and the second gear; and a fourth gear attached with a drive shaft that connects the second motor with the second driving wheel, the fourth gear operably connected with both the first gear and the second gear.

Finally, as can be appreciated by one in the art, the present invention also comprises a method for forming and using the vehicle described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7 is an illustration of a center track drive wheel with the differential gear set; and.

DETAILED DESCRIPTION

The present invention relates to a remotely controlled vehicle and, more particularly to a remotely controlled track mechanism that includes two independently operated wheels that laterally flank the track mechanism. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Details of Specific Aspects

Figure 1:
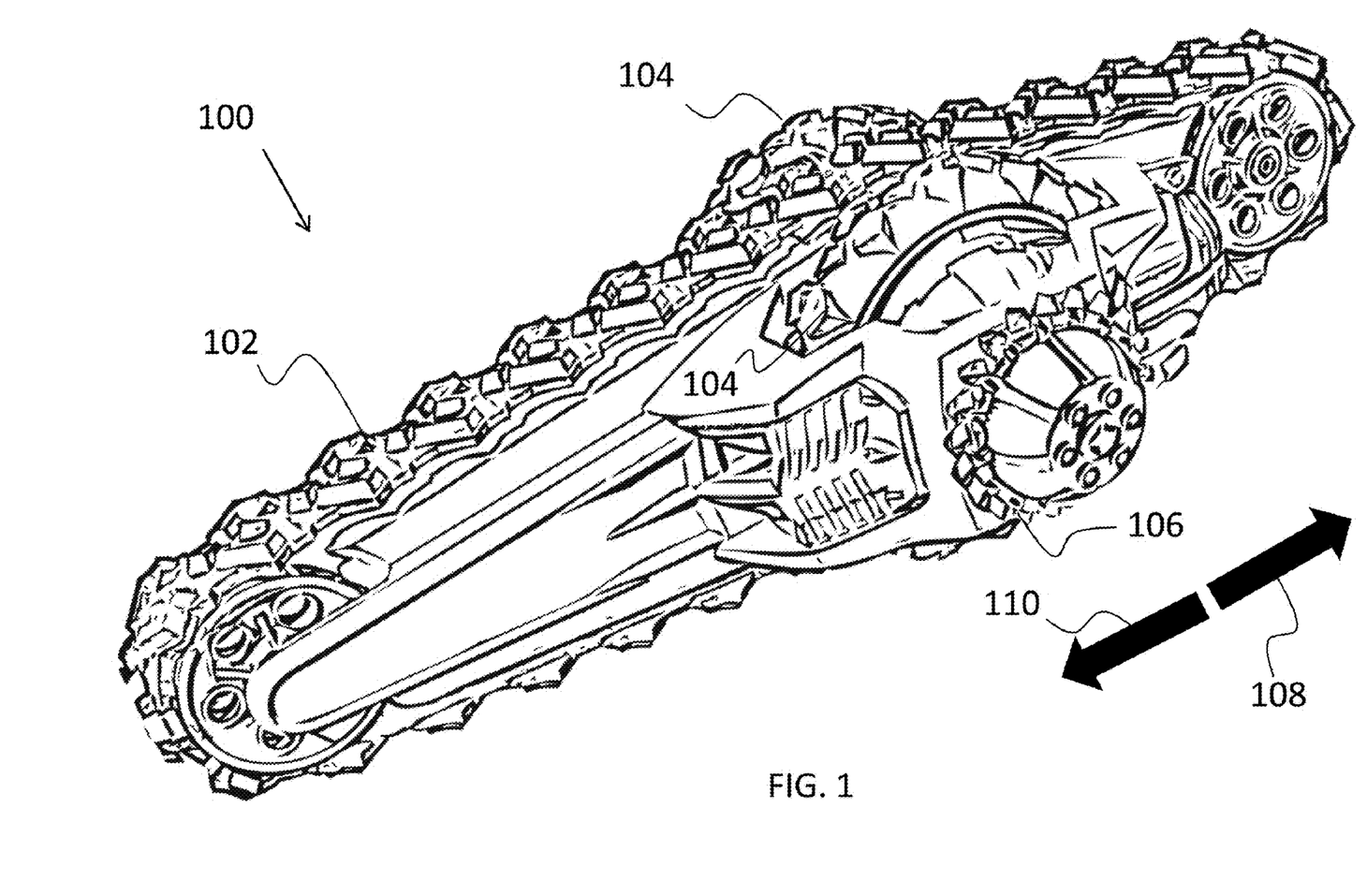
FIG. 1 is a perspective-view illustration of a remotely controlled vehicle according to the present invention.

As shown in FIG. 1, the present invention relates to a vehicle 100 with a track mechanism 102 and two independently operated driving wheels 104 that flank the track mechanism. Also shown are a pair of outer wheels 106 that are mounted on opposing lateral sides of the pair of driving wheels 104 in flanking relation. Each of the outer wheels 106 is attached with a corresponding driving wheel 104 such that operating a driving wheel 104 operates a corresponding outer wheel 106. The driving wheels 104 are used to provide a propelling force to the vehicle 100 such that when both driving wheels 104 are engaged in a forward 108 driving direction, the vehicle 100 is propelled forward 108. Alternatively, when both driving wheels 104 are engaged in a reverse 110 driving direction, the vehicle 100 is propelled in reverse 110. Because each of the driving wheels 104 are independently controlled, they may be used to turn the vehicle 100. For example, activation of a single driving wheel 104 will turn the vehicle 100. Alternatively, activation of both driving wheels 104 in opposing directions will cause the vehicle 100 to turn sharply or in some cases, spin in place.

Figure 2:
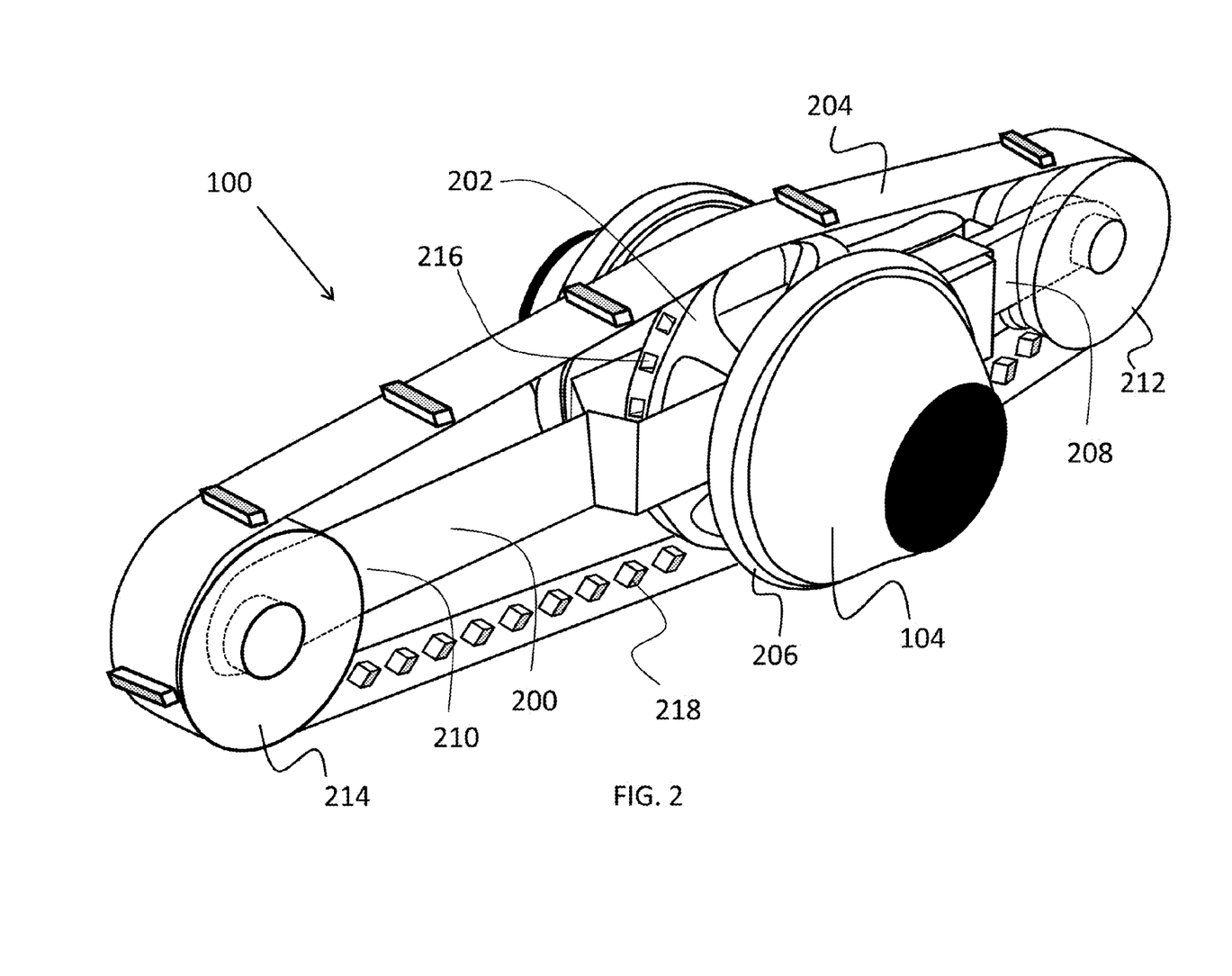
FIG. 2 is a perspective-view illustration of a remotely controlled vehicle according to the present invention, with an outer shell removed to illustrate internal components of the vehicle.

FIG. 2 provides another view of the vehicle 100, where an outer shell is removed to illustrate internal components of the vehicle 100. As shown in FIG. 2, the vehicle 100 includes a main frame structure 200 to form a backbone and support for the vehicle 100. The track assembly includes a center track drive wheel 202 mounted with respect to the main frame structure 200 and an endless center track 204 that extends in a vehicle 100 driving direction. The pair of driving wheels 104 are mounted on opposing lateral sides of the track assembly in flanking relation. Each of the driving wheels 104 includes a ground engaging traction surface 206 spaced laterally from the endless center track 204. The traction surface 206 is oriented generally in the vehicle 100 driving direction. In other words, the driving wheels 104 operate similar to that of a wheel or rim, while the traction surface 206 is analogous to a tire.

Additionally, the main frame structure 200 includes a front portion 208 and a rear portion 210. A front idler pulley 212 is attached with the front portion 208, while a rear idler pulley 214 is attached with the rear portion 210. The center track 204 wraps around the front idler pulley 212, the center track drive wheel 202, and the rear idler pulley 214. Thus, in operation, the center track drive wheel 202 (e.g. crown gear) causes the center track 204 to rotate around a periphery of the vehicle 100 and the idler pulleys 212 and 214. It should also be noted that the center track drive wheel 202 includes a plurality of wheel engagement mechanisms 216 formed to engage with corresponding track engagement mechanisms 218 that are affixed with the center track 204. The wheel engagement mechanism 216 and track engagement mechanism 218 are any suitable mechanism or device that enable for selective engagement with one another. As a non-limiting example, the track engagement mechanisms 218 are a plurality of knobs or hooks that are engageable with holes or catches (i.e., the wheel engagement mechanisms 216) in the center track drive wheel 202 to cause the center track 204 to engage with and rotate as the center track drive wheel 202 rotates.

Figure 3:
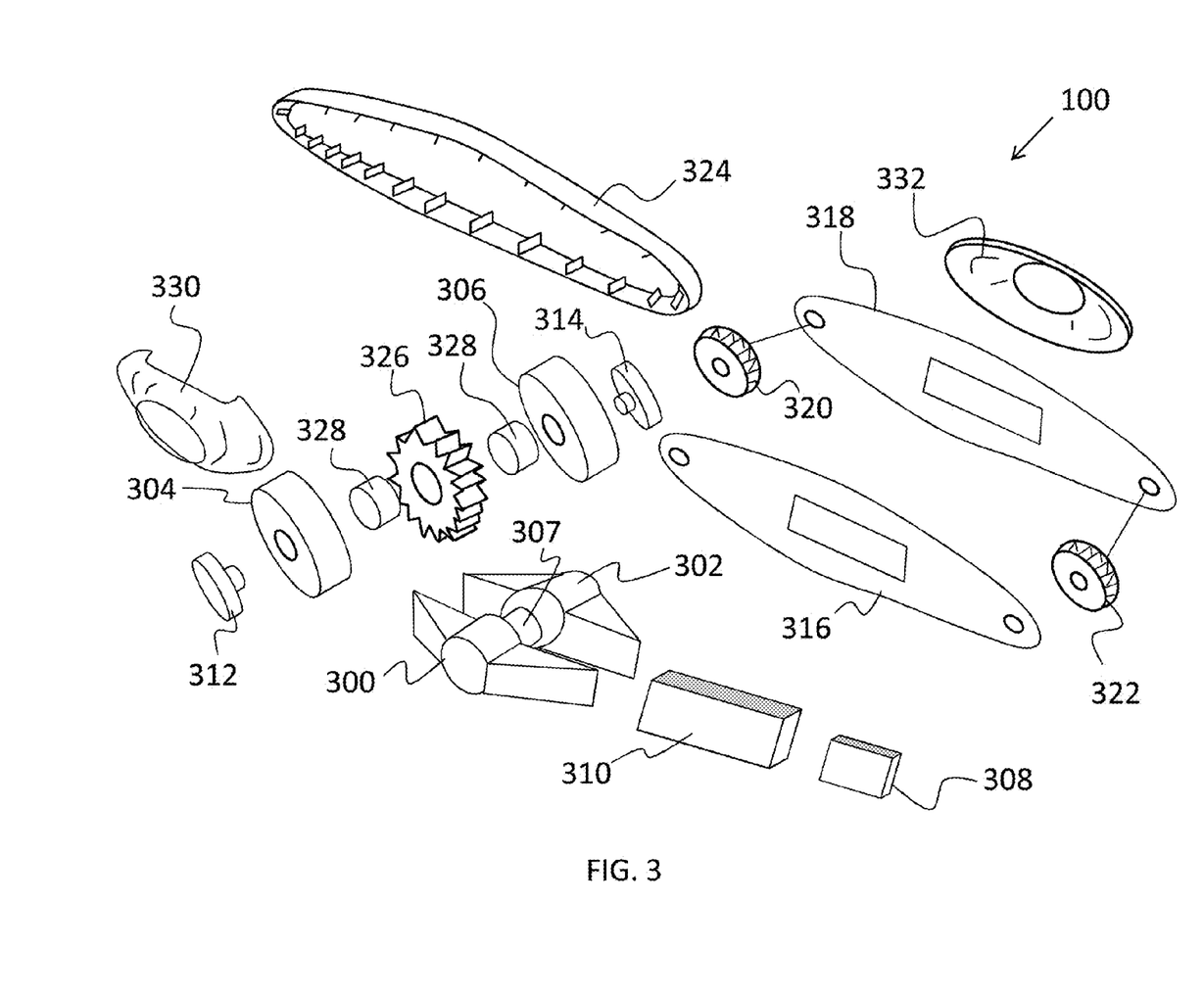
FIG. 3 is an exploded-view illustration of a remotely controlled vehicle according to the present invention, illustrating components of the vehicle.

For further illustration, FIG. 3 is an exploded-view illustration of the present invention. As shown in FIG. 3, the vehicle 100 includes two separate motors, illustrated as a left electric motor 300 and a right electric motor 302. Each of the motors are independently controlled (operated) and attached to one of the driving wheels. For example, the left motor 300 is attached with the left driving wheel 304, while the right motor 302 is attached with the right driving wheel 306. Each motor 300 and 302 is arranged to supply power (rotational force) to only one of the driving wheels 304 and 306 through the use of a gear system 307, a non-limiting example of which includes reduction gears.

As can be appreciated by one skilled in the art, the present invention is also formed to operate as a remotely controlled vehicle. In this aspect, the present invention also includes a receiver 308 attached with the main frame structure. The receiver 308 is any suitable receiver mechanism that is operable for receiving a control signal from a transmitter and controlling the pair of motors in accordance with the control signal. To power the motors 300 and 302, a power supply 310 is included. The power supply 310 is any suitable mechanism or device that is capable of storing and providing power, a non-limiting example of which includes a 9.6 volt nickel-metal hydride battery.

Also depicted are a left outer wheel 312 and a right outer wheel 314. As noted above, the outer wheels 312 and 314 spin when the corresponding driving wheels 304 and 306 are rotating. The outer wheels 312 and 314 can also be made to be fixed, or, using gearing, can be made to spin in opposite directions than the corresponding driving wheels 304 and 306. For example, if the left driving wheel 304 is rotating clockwise, gearing can be used to cause the left outer wheel 312 to rotate counter clockwise. However, as can be appreciated by one skilled in the art, it may be desirable to have each outer wheel 312 and 314 spin in the same direction as the corresponding drive wheel 304 and 306. For example, if the left drive wheel 304 is rotating clockwise, the left outer wheel 312 is attached such that it also rotates clockwise.

Connecting all the components is the frame structure. The frame structure can be a single piece or a plurality of pieces. As a non-limiting example and as depicted in FTG. 3, the frame structure can be formed of a left frame structure 316 and a right frame structure 318, upon which the components of the present invention are mounted. Additional components include the front idler pulley 320 and the rear idler pulley 322. Also included is the center track 324 which wraps around the center track drive wheel 326. Optional spacers 328 can be used to space each of the drive wheels 304 and 306 from the center track drive wheel 326. Finally, encasing the components is a left housing 330 and a right housing 332. The left and right housing 330 and 332 are used to protect the internal components of the vehicle 100.

Figure 4:
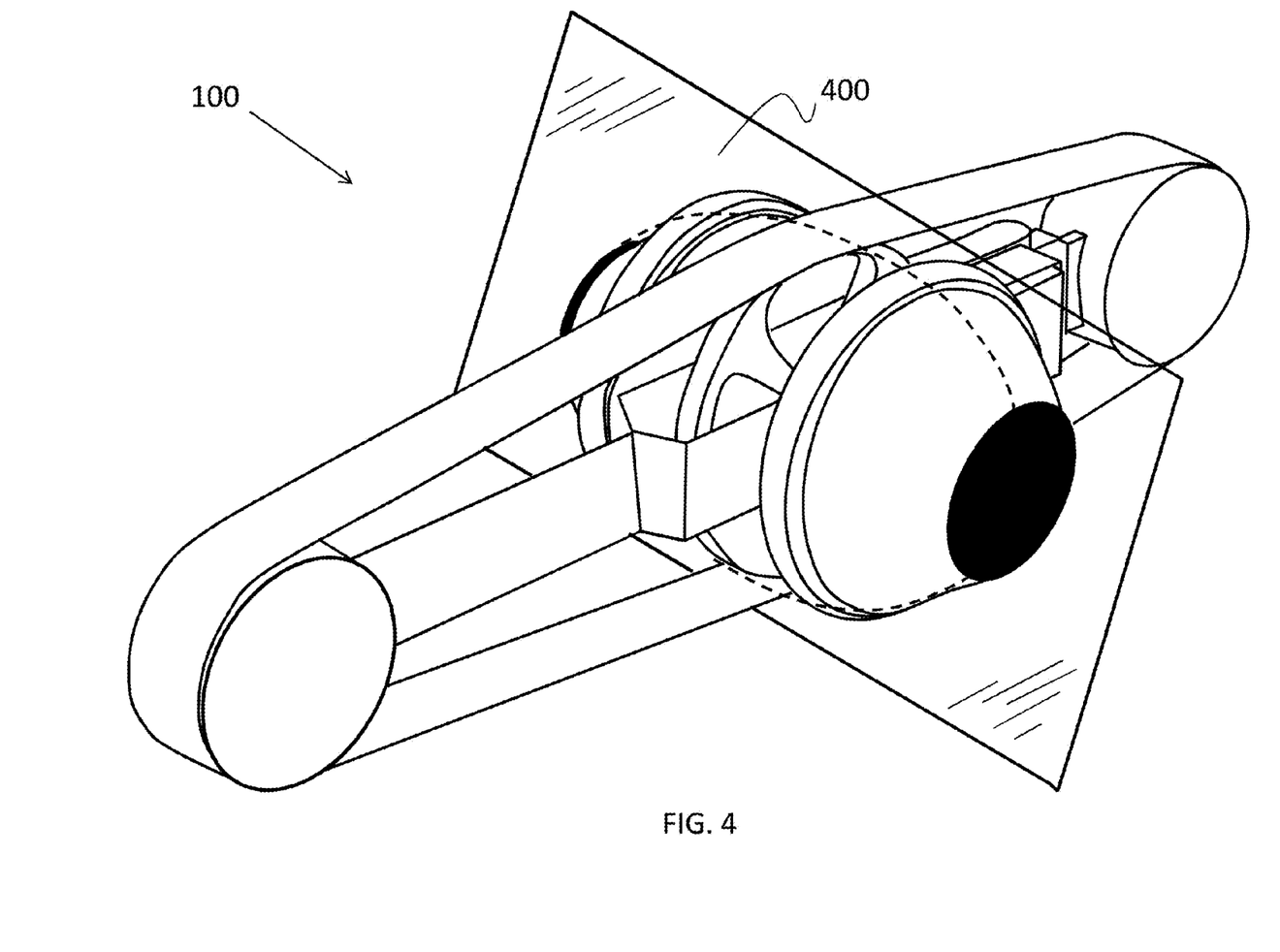
FIG. 4 is a perspective-view illustration of a remotely controlled vehicle according to the present invention, showing a plane of intersection defining the sectional-view illustrated in FIG. 5.

A unique aspect of the present invention is a differential gear set that allows for control of the center track. For further illustration, FIG. 4 is a perspective-view illustration of the vehicle 100, showing a plane of intersection 400 defining a cross-sectional view that is further illustrated in FIG. 5.

Figure 5:
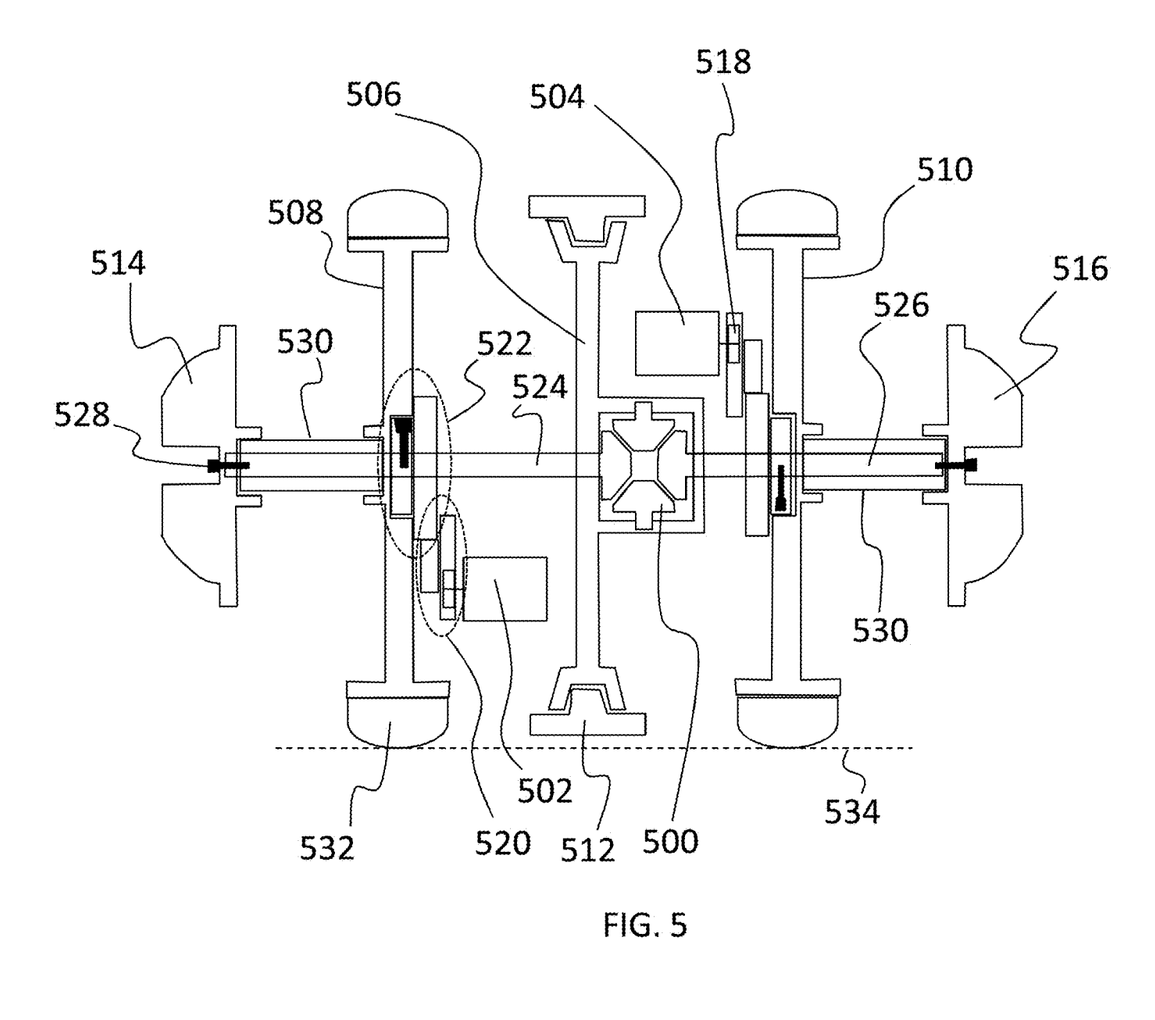
FIG. 5 is a sectional-view illustration of the remotely controlled vehicle according to the present invention.

FIG. 5 illustrates a cross-sectional view of a drive system according to the present invention. As shown in FIG. 5, a differential gear set 500 is operatively connected between each of the two motors 502 and 504 and the center track drive wheel 506. The differential gear set 500 includes gears that are formed to drive the center track drive wheel 506 in a vehicle driving direction when both motors 502 and 504 are concurrently operated to drive the pair of driving wheels 508 and 510 in the vehicle driving direction. Additionally, the differential gear set 500 is further formed to impart a driving force to each of the driving wheels 508 and 510 that is greater than a driving force imparted to the center track drive wheel 506 when each of the motors 502 and 504 are operating to drive the pair of driving wheels 508 and 510 in opposing directions, thereby causing the vehicle to turn. In other words, the differential gear set 500 enables the center track 512 to rotate in the same direction as the driving wheels 508 and 510 when the driving wheels 508 are 510 are rotating in the same driving direction. Alternatively, the gear set 500 imparts little if any driving force to the center track 512 when the driving wheels 508 and 510 are driven in opposing driving directions.

Also depicted is the left outer wheel 514 and the right outer wheel 516. Further, as can be appreciated by one skilled in the art, each motor 502 and 504 uses a gear system to connect to and cause each of the corresponding driving wheels 508 and 510 to rotate. As a non-limiting example, each motor 502 and 504 has a pinion gear 518 that is connected to a set of reduction gears 520 that engage with wheel drive gear(s) 522 (at least one of which is affixed with a driving wheel 508 or 510) to cause the driving wheels 508 and 510 to rotate.

It should also be noted that a left drive shaft 524 is attached with the left driving wheel 508 such that rotating the left driving wheel 508 rotates the left drive shaft 524. Alternatively, a right drive shaft 526 is attached with the right driving wheel 510 such that rotating the right driving wheel 510 rotates the right drive shaft 526. Each of the left drive shaft 524 and right drive shaft 526 are engagingly connected with the differential gear set 500 and impart the rotary motion to the gear set 500. Further, each of the left and right drive shafts 524 and 526 are connected with the corresponding outer left and right wheels 514 and 516 to impart the appropriate rotary motion to each of the outer left and right wheels 514 and 516. Wheel screws 528 are depicted as solid blocks affixing the illustrated components. For example, a wheel screw 528 affixes the left outer wheel 514 to the left drive draft 524, while additional wheel screws 528 affix the driving wheels 508 and 510 to the corresponding wheel drive gear 522 and drive shaft 524 or 526. Also depicted are the optional spacers 530.

Finally, it should be noted that the ground engaging traction surfaces 532 can be optionally positioned and/or formed such that they extend beyond the reach 534 of the center track 512 to engage with the ground surface and drive the vehicle at the point of contact provided by each of the engaging traction surfaces 532. Such a configuration provides an increased area of traction for each of the ground engaging traction surfaces 532.

Figure 6:
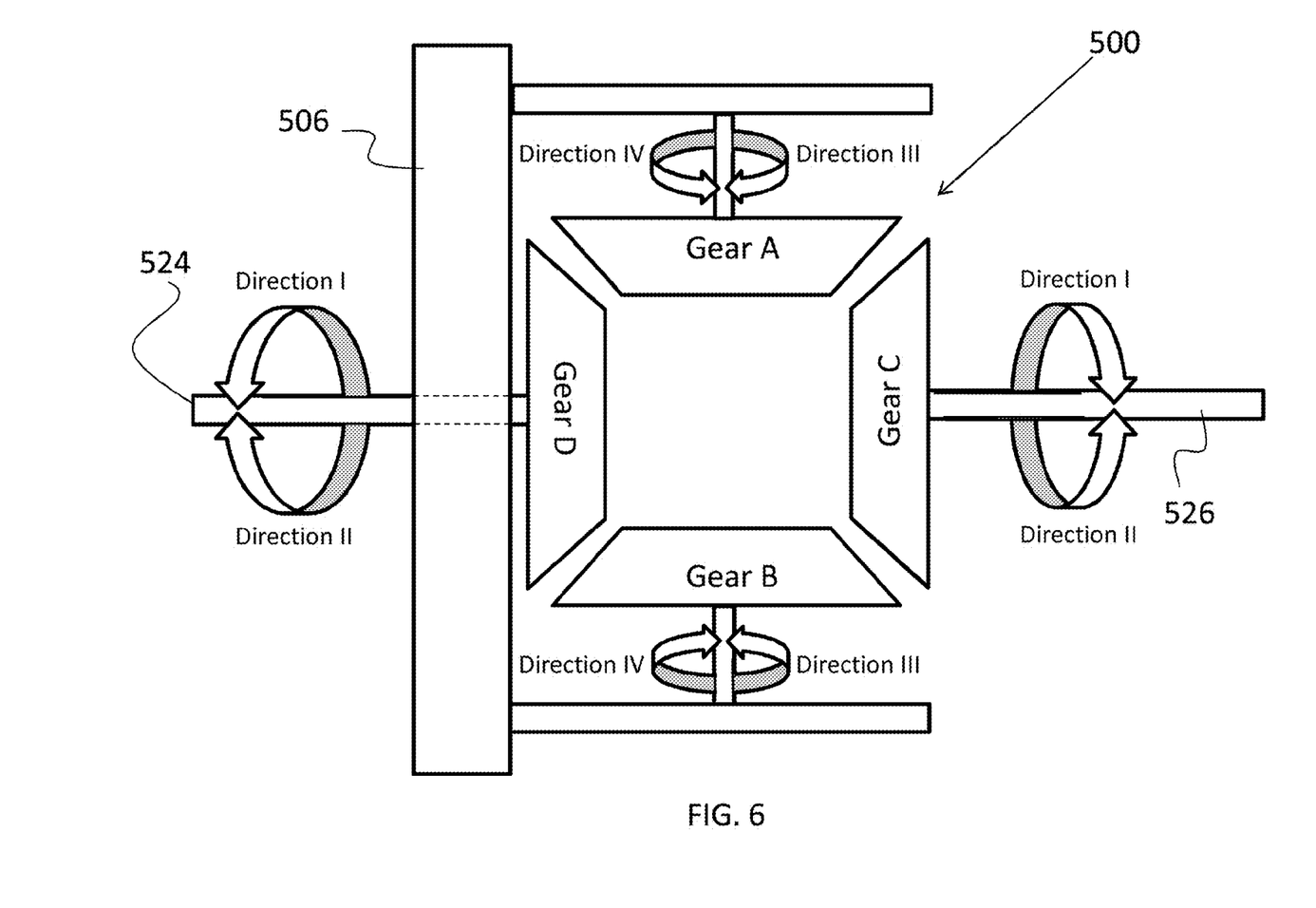
FIG. 6 is a close-up view illustration of a differential gear set according to the present invention.

For further understanding, FIG. 6 is a close-up view of the differential gear set 500 that was illustrated in FIG. 5. It should be noted that although FIG. 6 illustrates the gears as having a gap therebetween, in actuality, the gears are in contact and engaged with the neighboring gears. For example, Gear A (e.g., $1^{st}$ gear) is physically engaged with both Gear C (e.g., $3^{rd}$ gear) and Gear D (e.g., $4^{th}$ gear). Additionally, Gear B (e.g., $2^{nd}$ gear) is physically engaged with both Gear D and Gear C. As shown in FIG. 6, rotation of the various gears in the differential gear set 500 provides a variety of forces that affect the center track drive wheel 506 and the left and right drive shafts 524 and 526. For clarity, the function of the differential gear set 500 will be described in two parts: (a) when each of the wheels is being rotated in an opposing direction; and (b) when both wheels are being rotated in the same direction.

a. When Each of the Wheels is being Rotated in an Opposing Direction

When Gear D is being turned in Direction I and Gear C is being turned in Direction II, this causes Gear A to rotate in Direction IV and Gear B to rotate in Direction III, thus imparting little if any rotation to the center track drive wheel 506.

Alternatively, when Gear D is being turned in Direction II and Gear C is being turned in Direction I, this causes Gear A to rotate in Direction III and Gear B to rotate in Direction IV, thus imparting little if any rotation to the center track drive wheel 506.

b. When Both Wheels are being Rotated in the Same Direction

When Gear D is rotated in Direction II, this creates a force on Gear A to turn in Direction III. However, when Gear C is rotated in Direction II, this creates a force on Gear A to turn in Direction IV. Thus, because Gear A is unable to rotate freely because of the two opposing forces, this causes the center track drive wheel 506 (to which Gear A is attached) to rotate in Direction II. Added to this is the force received by Gear B. As Gear D is rotated in Direction II, this creates a force in Gear B to rotate in Direction IV. However, because Gear C is rotated in Direction II, this creates an opposing force on Gear B to rotate in Direction III. Thus, because Gear C is unable to rotate freely because of the two opposing forces, this adds to the rotational force (in Direction II) being applied to the center track drive wheel 506 (to which Gear B is attached).

As can be appreciated, rotating Gears D and C in Direction I causes the opposite effect and causes the center track drive wheel 506 to be rotated in Direction I.

Figure 7:
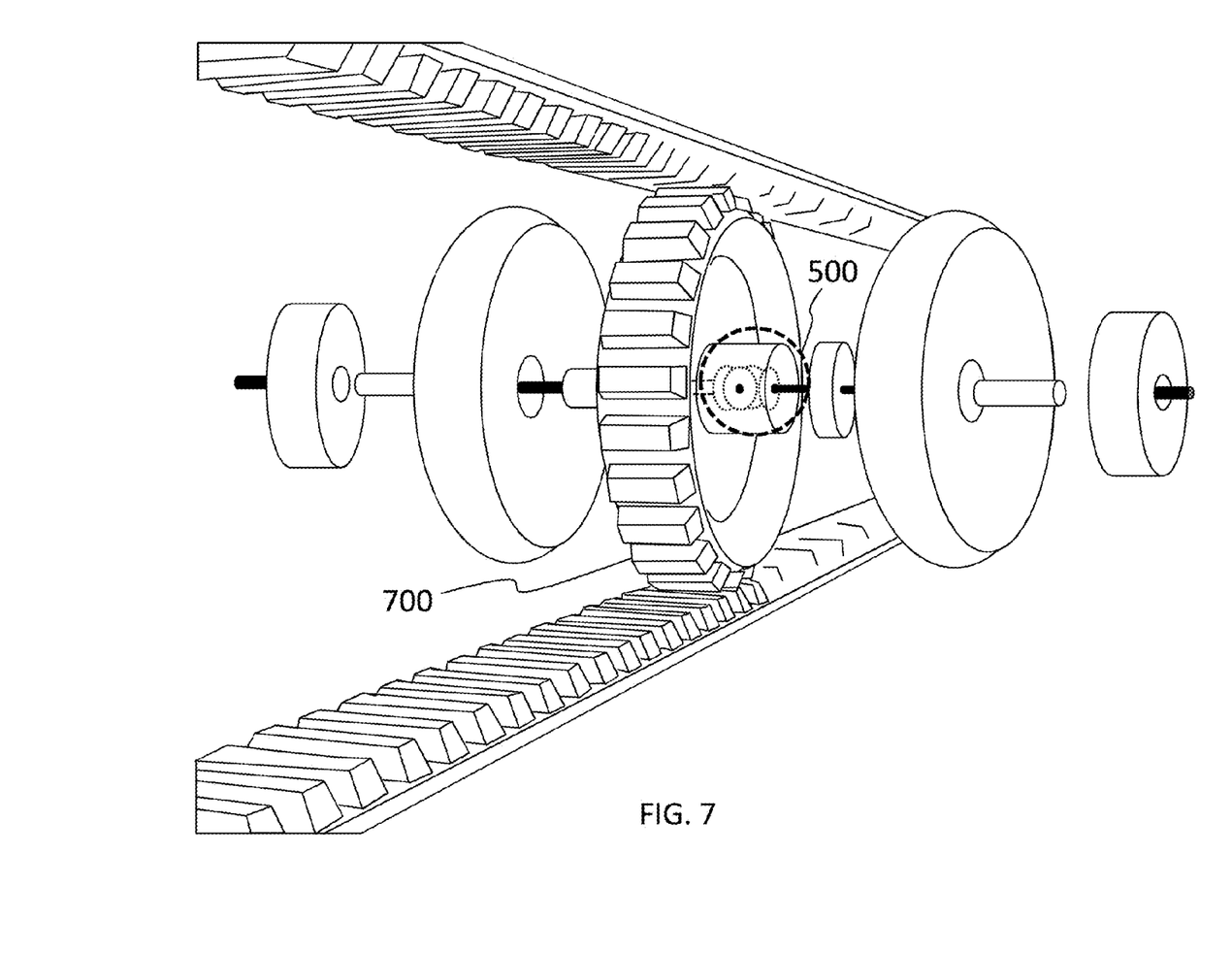

FIG. 7 illustrates yet another view of the center track drive wheel 700 and the differential gear set 500 of FIG. 5. FIG. 7 provides a perspective view of the interaction of the center track drive wheel 700 with other driving components of the vehicle.

Figure 8:
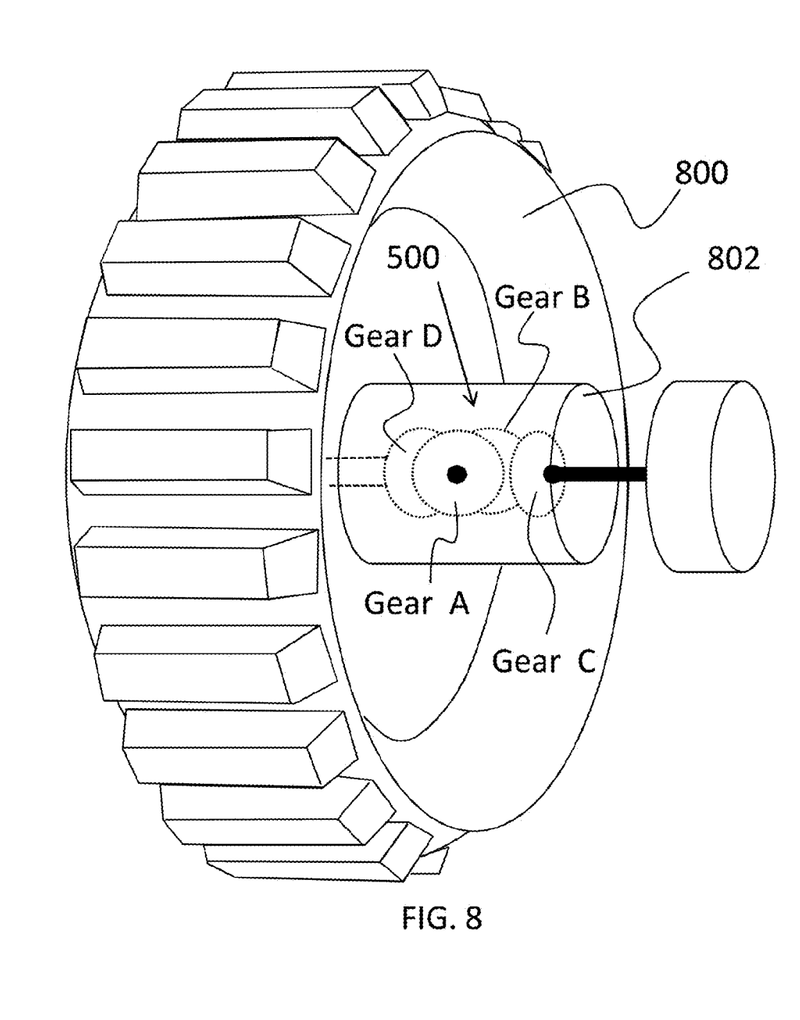
FIG. 8 is a close-up view illustration of a differential gear set according to the present invention.

Finally, FIG. 8 is a close-up view of the differential gear set shown in FIG. 7. As shown in FIG. 8, the differential gear set includes Gear A, Gear B, Gear C, and Gear D. It can be appreciated by one skilled in the art that additional and/or fewer gears can be positioned within the gear set to be connected between Gears C and D. Also as shown, the center track drive wheel 800 includes a centrally disposed hub 802, where the differential gear set 500 is positioned within the hub 802.

What is claimed is:

1. A vehicle with a track mechanism and independently operated wheels, comprising:
    a main frame structure;
    a track assembly that includes a center track drive wheel mounted with respect to the main frame structure and an endless center track that extends in a vehicle driving direction;
    a pair of driving wheels mounted on opposing lateral sides of the track assembly in flanking relation, each of the driving wheels including a ground engaging traction surface spaced laterally from the endless center track and oriented generally in the vehicle driving direction;
    two independently operated motors attached with the main frame structure, each motor arranged to supply power to only one corresponding driving wheel;
    a differential gear set operatively connected to each of the two motors and to the center track drive wheel, the differential gear set including gears that are formed to drive the center track drive wheel in the vehicle driving direction when both motors are concurrently operated to drive the pair of driving wheels in the vehicle driving direction; and
    wherein the differential gear set is further formed to impart a driving force to each of the driving wheels that is greater than a driving force imparted to the center track drive wheel when each of the motors are operating to drive the pair of driving wheels in opposing directions, thereby causing the vehicle to turn.

2. A vehicle as set forth in claim 1, further comprising a receiver attached with the main frame structure, the receiver being operable for receiving a control signal from a transmitter and controlling the motors in accordance with the control signal, thereby allowing a user to remotely control the vehicle.

3. A vehicle as set forth in claim 2, wherein the main frame structure includes a front portion and a rear portion, and further comprises a front idler pulley attached with the front portion and a rear idler pulley attached with the rear portion, such that the endless center track wraps around the front idler pulley, the center track drive wheel, and the rear idler pulley.

4. A vehicle as set forth in claim 3, further comprising a pair of outer wheels mounted on opposing lateral sides of the pair of driving wheels in flanking relation, each of the outer wheels attached with a corresponding driving wheel such that operating a driving wheel operates the corresponding outer wheel.

5. A vehicle as set forth in claim 4, wherein the center track drive wheel includes a centrally disposed hub, wherein the pair of driving wheels includes a first driving wheel and a second driving wheel, and wherein the two motors include a first motor and a second motor, and wherein the differential gear set is positioned within the hub and includes:
    a first gear rotationally attached to the hub;
    a second gear rotationally attached to the hub, opposite the first gear;
    a third gear attached with a drive shaft that connects the first motor with the first driving wheel, the third gear operably connected with both the first gear and the second gear; and
    a fourth gear attached with a drive shaft that connects the second motor with the second driving wheel, the fourth gear operably connected with both the first gear and the second gear.

6. A vehicle as set forth in claim 1, wherein the main frame structure includes a front portion and a rear portion, and further comprises a front idler pulley attached with the front portion and a rear idler pulley attached with the rear portion, such that the endless center track wraps around the front idler pulley, the center track drive wheel, and the rear idler pulley.

7. A vehicle with a track mechanism and independently operated wheels, comprising:
    a main frame structure;
    a track assembly that includes a center track drive wheel mounted with respect to the main frame structure and an endless center track that extends in a vehicle driving direction;
    a pair of driving wheels mounted on opposing lateral sides of the track assembly in flanking relation, each of the driving wheels including a ground engaging traction surface spaced laterally from the endless center track and oriented generally in the vehicle driving direction;
    two independently operated motors attached with the main frame structure, each motor arranged to supply power to only one corresponding driving wheel;
    a differential gear set operatively connected to each of the two motors and to the center track drive wheel, the differential gear set including gears that are formed to drive the center track drive wheel in the vehicle driving direction when both motors are concurrently operated to drive the pair of driving wheels in the vehicle driving direction; and
    a pair of outer wheels mounted on opposing lateral sides of the pair of driving wheels in flanking relation, each of the outer wheels attached with a corresponding driving wheel such that operating a driving wheel operates the corresponding outer wheel.

8. A vehicle with a track mechanism and independently operated wheels, comprising:
    a main frame structure;
    a track assembly that includes a center track drive wheel mounted with respect to the main frame structure and an endless center track that extends in a vehicle driving direction;
    a pair of driving wheels mounted on opposing lateral sides of the track assembly in flanking relation, each of the driving wheels including a ground engaging traction surface spaced laterally from the endless center track and oriented generally in the vehicle driving direction;

two independently operated motors attached with the main frame structure, each motor arranged to supply power to only one corresponding driving wheel;

a differential gear set operatively connected to each of the two motors and to the center track drive wheel, the differential gear set including gears that are formed to drive the center track drive wheel in the vehicle driving direction when both motors are concurrently operated to drive the pair of driving wheels in the vehicle driving direction; and wherein the center track drive wheel includes a centrally disposed hub, wherein the pair of driving wheels includes a first driving wheel and a second driving wheel, and wherein the two motors include a first motor and a second motor, and wherein the differential gear set is positioned within the hub and includes:

a first gear rotationally attached to the hub;

a second gear rotationally attached to the hub, opposite the first gear;

a third gear attached with a drive shaft that connects the first motor with the first driving wheel, the third gear operably connected with both the first gear and the second gear; and a fourth gear attached with a drive shaft that connects the second motor with the second driving wheel, the fourth gear operably connected with both the first gear and the second gear.

* * * * *